United States Patent

Sinha

(10) Patent No.: US 6,904,462 B1
(45) Date of Patent: Jun. 7, 2005

(54) METHOD AND SYSTEM FOR ALLOCATING PROTECTION PATH RESOURCES

(75) Inventor: Rakesh Kumar Sinha, Eatontown, NJ (US)

(73) Assignee: Ciena Corporation, Linthicum, MD (US)

( * ) Notice: Subject to any disclaimer, the term of this patent is extended or adjusted under 35 U.S.C. 154(b) by 763 days.

(21) Appl. No.: 10/011,457

(22) Filed: Oct. 30, 2001

Related U.S. Application Data

(60) Provisional application No. 60/303,495, filed on Jul. 6, 2001.

(51) Int. Cl.$^7$ .................. G06F 15/173; G01R 31/08; H04L 12/28
(52) U.S. Cl. .................. 709/226; 709/238; 370/216; 370/351
(58) Field of Search ................ 709/226, 238; 370/216, 351

(56) References Cited

U.S. PATENT DOCUMENTS

| | | | |
|---|---|---|---|
| 6,154,296 A | * 11/2000 | Elahmadi et al. | 370/216 |
| 6,256,309 B1 | * 7/2001 | Daley et al. | 370/395.43 |
| 6,680,912 B1 | * 1/2004 | Kalman et al. | 370/351 |
| 2001/0032271 A1 | 10/2001 | Allen | 709/239 |
| 2002/0054572 A1 | 5/2002 | Saleh et al. | 370/254 |
| 2002/0067693 A1 | 6/2002 | Kodialam, et al. | 370/216 |
| 2002/0071392 A1 | 6/2002 | Grover et al. | 370/241 |
| 2002/0093954 A1 | 7/2002 | Weil et al. | 370/389 |
| 2002/0097461 A1 | 7/2002 | Patel et al. | 359/110 |
| 2002/0186665 A1 | * 12/2002 | Chaffee et al. | 370/351 |

OTHER PUBLICATIONS

PCT, "International Search Report."

* cited by examiner

*Primary Examiner*—Zarni Maung
*Assistant Examiner*—Hassan Phillips
(74) *Attorney, Agent, or Firm*—Michael R. Cammarata; Douglas Luftman

(57) ABSTRACT

An embodiment of the invention is a method of allocating protection path resources including defining a working path and obtaining a link vector for each of a plurality of protection paths. The link vector includes a plurality of link vector elements. A proposed link vector is determined for each of the protection paths. The proposed link vector includes a plurality of proposed link vector elements and is indicative of allocating a respective protection path to the working path. A maximum link vector element is determined and a maximum proposed link vector element is determined. A link cost is determined based on a difference between the maximum proposed link vector element and the maximum link vector element. A path cost is determined for at least two protection paths based on a sum of link costs associated with a respective protection path. One of the at least two protection paths having the minimum path cost is selected to provide protection for the working path.

18 Claims, 5 Drawing Sheets

METHOD AND SYSTEM FOR ALLOCATING PROTECTION PATH RESOURCES

CROSS REFERENCE TO RELATED APPLICATIONS

This application claims the benefit of U.S. Provisional patent application, Protection Path Sharing Schemed, Ser. No. 60/303,495, filed Jul. 6, 2001, the entire contents of which are incorporated herein by reference.

BACKGROUND OF THE INVENTION

1. Field of Invention

The invention relates generally to communications networks and in particular to a method and system for allocating protection path resources in a communications network.

2. Description of Related Art

In existing communications networks, protection paths are provided for one or more working paths in the event the working path fails. A variety of protection topologies exist and include assigning a single protection path for each working path (referred to as 1:1) or multiple working paths sharing a protection path (referred to as 1:N). Protection topologies also vary depending on the network topology and may be implemented in linear, ring or mesh configurations. Protection mechanisms may be implemented at the link level such as automatic protection switching (APS) or at higher levels such as ring level bi-directional line switched ring (BLSR).

In many situations, there is a desire to limit the amount of protection path bandwidth while still providing adequate protection. This is the motivation behind 1:N protection. Whenever protection path bandwidth is increased, this reduces available bandwidth for working paths. Thus, there is a need for a method of allocating protection path resources that limits increases in protection path bandwidth.

SUMMARY OF THE INVENTION

An embodiment of the invention is a method of allocating protection path resources including defining a working path and obtaining a link vector for each of a plurality of protection paths. The link vector includes a plurality of link vector elements. A proposed link vector is determined for each of the protection paths. The proposed link vector includes a plurality of proposed link vector elements and is indicative of allocating a respective protection path to the working path. A maximum link vector element is determined and a maximum proposed link vector element is determined. A link cost is determined based on a difference between the maximum proposed link vector element and the maximum link vector element. A path cost is determined for at least two protection paths based on a sum of link costs associated with a respective protection path. One of the at least two protection paths having the minimum path cost is selected to provide protection for the working path.

Further scope of applicability of the present invention will become apparent from the detailed description given hereinafter. However, it should be understood that the detailed description and specific examples, while indicating preferred embodiments of the invention, are given byway of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
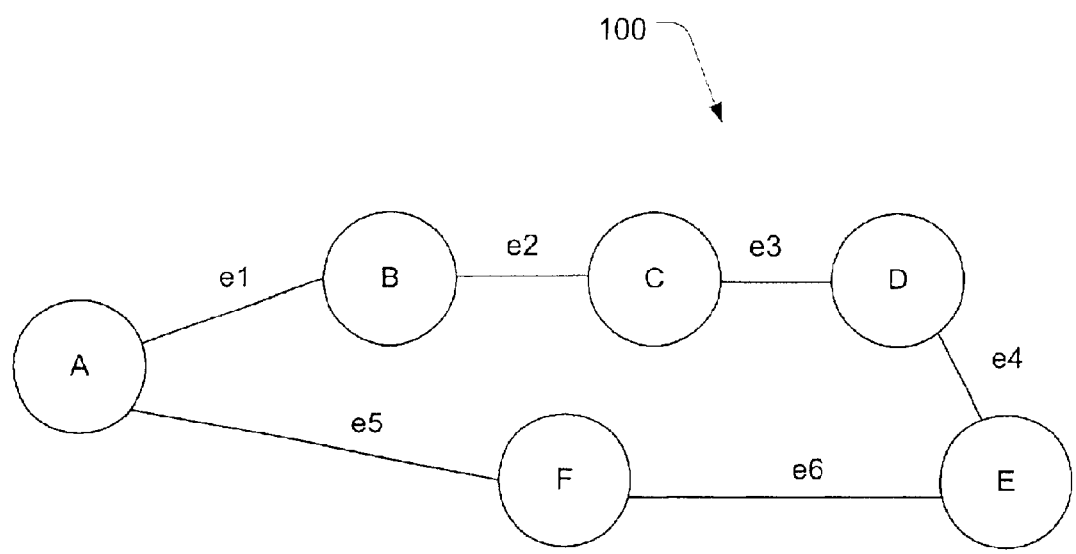
FIG. 1 is a block diagram of a portion of an exemplary network.

FIG. 1 is a block diagram of a portion of an exemplary network 100. FIG. 1 depicts an exemplary arrangement and is presented to facilitate description of the invention. Network 100 includes a plurality of communicating network elements labeled A–F. Network 100 may be any type of communications network (e.g., an optical network) using a variety of communications formats such as MPLS, ATM, frame relay, etc. The network elements A–F may be any type of known network devices such as routers, switches, transceivers, repeaters, add-drop multiplexers, etc.

Network elements A–F are connected by a plurality of links referenced as e1–e6. Links e1–e6 maybe any transmission medium capable of carrying signals such as optical fiber, coaxial cable, twisted pair cable, wireless channels, etc. The network elements and links define paths through the network 100. In the example shown in FIG. 1, the network elements and links provide paths between network element A and network element E. The paths are characterized as either working paths or protection paths. As known in the art, protection paths are provided in the event a working path becomes disrupted. Links in a working path are referred to as working links and links in a protection path are referred to as protection links. In the example shown in FIG. 1, the path through network elements A-B-C-D-E is a working path. Path A-F-E is a protection path providing protection for working path A-B-C-D-E.

Each working link e1–e4 and protection link e5–e6 is associated with one or more shared risk groups (SRG). An SRG is a group of links that will tend to fail collectively due to factors such as physical location. For example, an SRG may be a number of links (e.g., optical fibers) contained in the same conduit. If the conduit is disrupted, the links in this group will fail. The different SRG's are referenced as $SRG_1$–$SRG_n$ herein.

In assigning protection paths to working paths, one goal is to enhance usage of protection path bandwidth. Multiple working paths may share a common protection path to reduce unnecessary protection path bandwidth. An exemplary embodiment of the invention determines how protection paths should be allocated to reduce designation of additional protection path bandwidth.

To determine the amount of bandwidth associated with each protection path, each protection link is assigned a protection link vector having vector elements. Each vector element corresponds to a specific SRG and identifies the amount of bandwidth allocated by that link to protect all working connections containing at least one link from that particular SRG. Thus, the length of the protection link vector is equal to the number of SRG's in the network. For example, if link e5 is assigned to provide 10 bandwidth units to protect working connections containing at least one link from $SRG_1$, 5 bandwidth units to protect working connections containing at least one link from $SRG_2$, and 15 bandwidth units to protect working connections containing at least one link from $SRG_3$, the protection link vector for protection link e5 would be 10, 5, 15. A bandwidth unit may correspond to any measure of bandwidth such as 1 Gbs. The protection link vector may have zero value elements indicating that the protection link is not utilized by an SRG.

Figure 2:
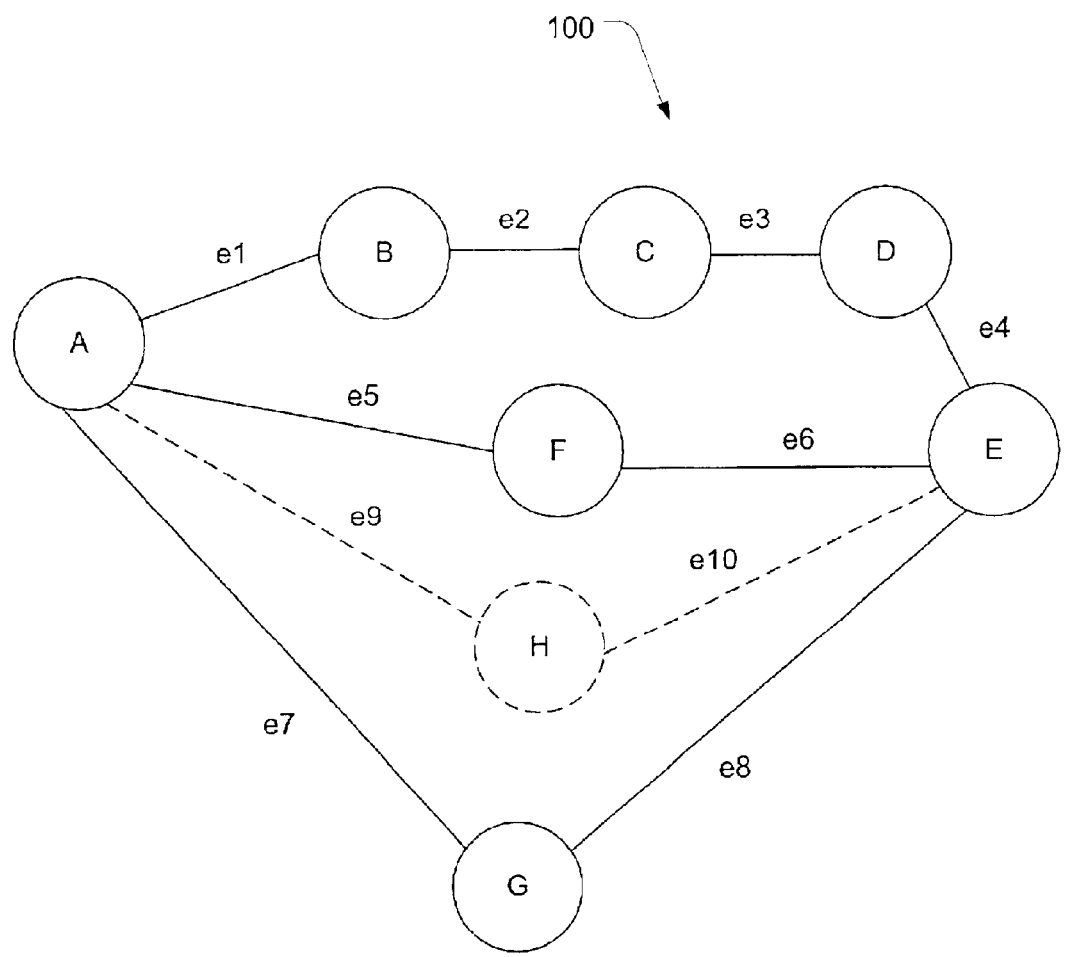
FIG. 2 is a block diagram of a portion of an exemplary network.

FIG. 2 illustrates the addition of a new working path through network elements A-G-E and links e7 and e8. Upon creation of a new working path, an exemplary embodiment of the invention determines the allocation of protection bandwidth for the new working path such that creation of new protection path bandwidth is limited. Typically, assigning path protection bandwidth involves determining whether an existing protection path should be used or a new protection path be created. In the example shown in FIG. 2, a potential new protection path through network elements A-H-E and links e9 and e10 is depicted.

Figure 3:
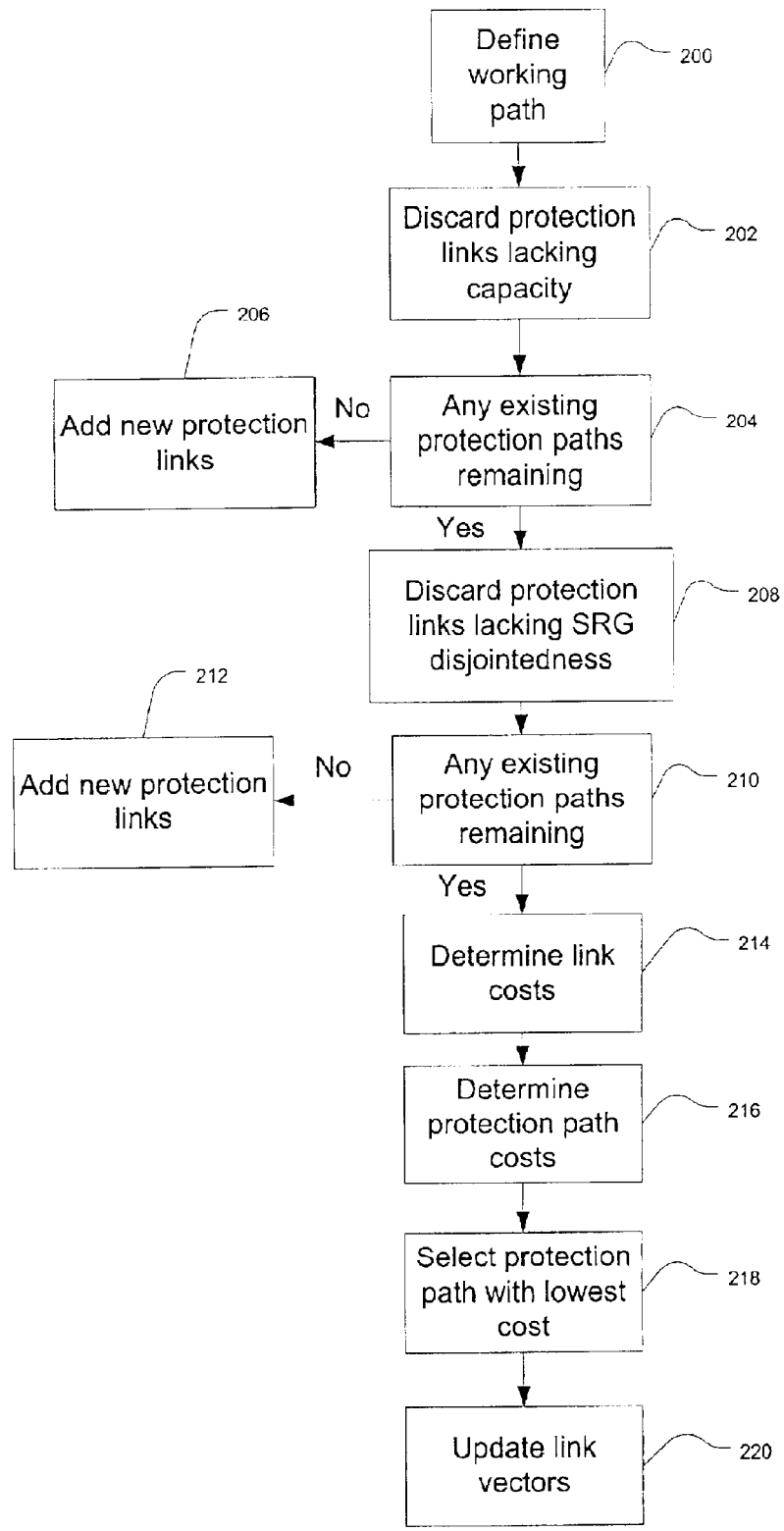
FIG. 3 is a flowchart of an exemplary process for selecting a protection path.

An exemplary process for allocating protection path bandwidth is depicted in FIG. 3. The process may be implemented by an originating network element in network 100. In the example shown in FIG. 2, the process is executed by network element A which is the originating network element for working path A-G-E. Network element A may include a processor that executes the process of FIG. 3 in response to a computer program contained in a storage medium accessible by the processor.

The process begins at step 200 where the working path for which protection is sought is defined. The working path may be defined by the number of bandwidth units needed from each SRG. For example, a new working path may be defined as requiring 10 bandwidth units from $SRG_1$ and 10 bandwidth units from $SRG_2$. Similarly, if a working path is being increased in bandwidth, and the assigned protection path lacks capacity for the increase, then the assigned protection path is released and an alternate protection path is determined.

Once the working path is defined flow proceeds to step 202 where protection links lacking capacity to protect the defined working path are disregarded. For example, if the defined working path requires 30 bandwidth units, protection links lacking the capacity to increase by 30 bandwidth units are eliminated from consideration.

At step 204 it is determined whether any protection paths remain after eliminating the links in step 202. If no protection path exists after eliminating the links in step 202, then flow proceeds to step 206 where new protection links are added to protect the defined working path since the existing set of protection links lack the bandwidth needed to create a protection path.

If existing set of links have the needed capacity to create a protection path for the defined working path, flow proceeds to step 208 where links lacking SRG disjointedness with the defined working path are disregarded. SRG disjointedness refers to this link not being in the same SRG group as any link in the working path. If the working path and the protection path include links in the same SRG, then there is a higher likelihood that the protection path and working path will fail simultaneously. This defeats the purpose of providing protection paths, and thus SRG disjointedness is desirable between a working path and protection path.

Flow proceeds to step 210 where it is determined if any protection paths remain after eliminating the links in step 208. If no protection path exists after eliminating the links in step 206, then flow proceeds to step 212 where new protection links are added to protect the defined working path since the existing protection links cannot create a protection path.

If existing protection links have the needed capacity and disjointedness to create a protection path for the defined working path, flow proceeds to step 214 where a link cost is determined for each protection link of the existing protection paths and each protection link of the proposed new protection path. The link cost defines the burden, in increased bandwidth, placed on each protection link by using that protection link to protect the defined working path.

Figure 4:
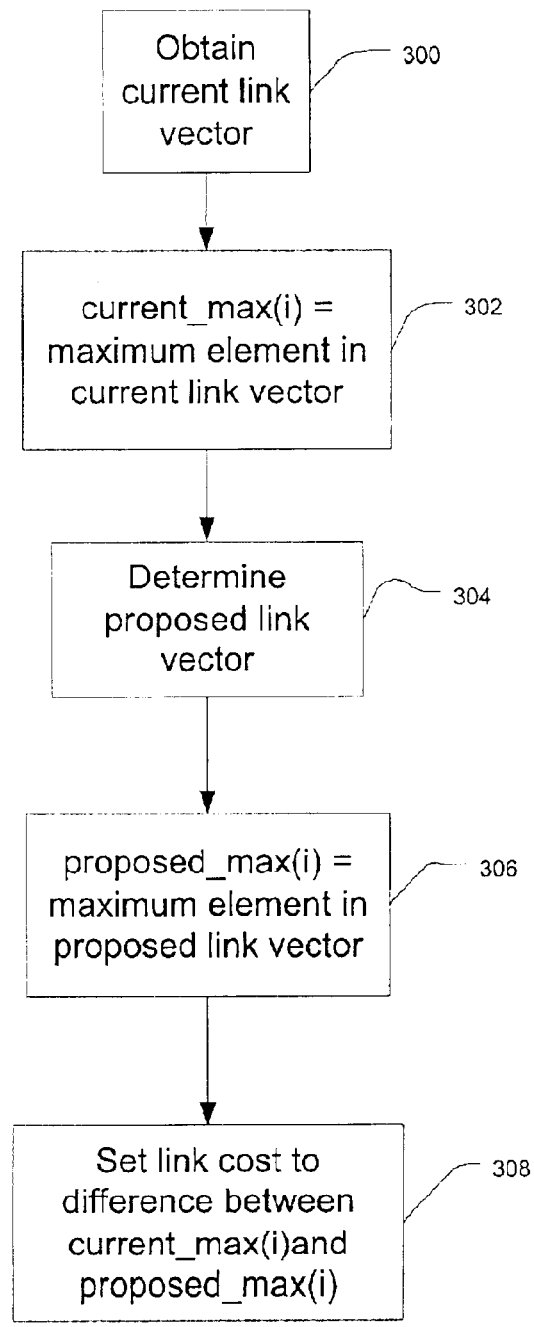
FIG. 4 is a flowchart of an exemplary process for determining protection link cost.

FIG. 4 is flowchart of an exemplary process for determining the link cost. The process is performed for each protection link in existing protection paths and the new protection path. The process begins at step 300 where the current vector for the protection link is obtained.

Figure 5:
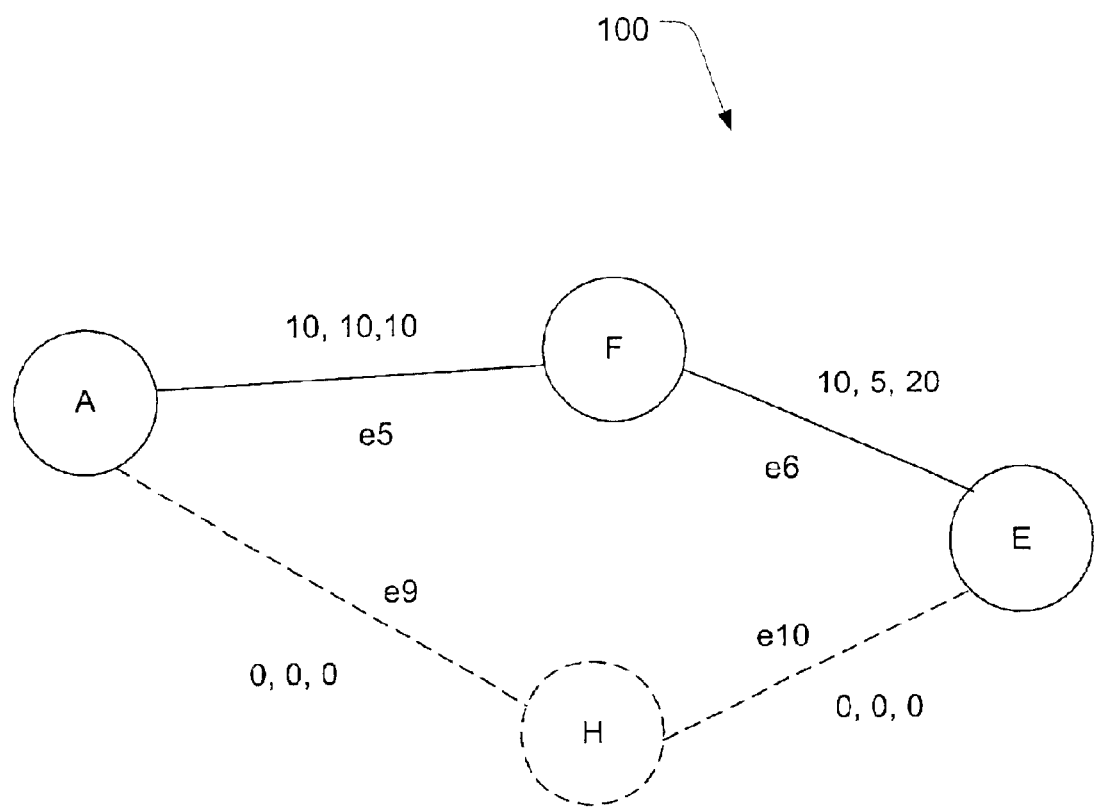
FIG. 5 illustrates exemplary protection path link vectors.

FIG. 5 illustrates existing protection path A-F-E including protection links e5 and e6. Protection link e5 is allocated 10 bandwidth units from $SRG_1$, 10 bandwidth units from $SRG_2$ and 10 bandwidth units from $SRG_3$. The link vector for protection link e5 is (10, 10, 10). Protection link e6 is allocated 10 bandwidth units from $SRG_1$ and 5 bandwidth units from $SRG_2$ and 20 bandwidth units from $SRG_3$. The link vector for protection link e6 is (10, 5, 20). Optional new protection path A-H-E through links e9 and e10 has no bandwidth units allocated to it yet. Thus, the link vector for protection links e9 and e10 is (0, 0, 0).

Once the current link vectors are obtained, flow proceeds to step 302 where the maximum link vector element is determined for each protection link. For example, as shown in FIG. 5, the maximum link vector element for protection link e5 is 10. The maximum link vector element for protection link e6 is 20. The maximum link vector element for protection links e9 and e10 is 0. The maximum link vector element may be represented as a variable current_max(i), where value i identifies the protection link.

Once the maximum link vector elements are defined, flow proceeds to step 304 where proposed link vectors are determined for each protection link. The proposed link vector is determined by adding the defined working path bandwidth requirements for each SRG to the current link vector elements. Referring to FIG. 5, assume the defined working path for which protection is needed uses 10 bandwidth units of $SRG_1$ and 10 bandwidth units of $SRG_2$. The proposed link vectors are determined by adding the working path bandwidth units to the protection link bandwidth units. Thus, the proposed link vector for protection link e5 is (10+10, 10+10, 10+0) or (20, 20, 10). Similarly, the proposed link vectors for protection links e6, e9 and e10 are (20, 15, 20), (10, 10, 0) and (10, 10, 0), respectively.

At step 306, the proposed maximum link vector element is determined for each proposed protection link. This is performed in the same manner as determining the current maximum link vector element described above. The proposed maximum link vector element may be represented as a variable proposed_max(i), where value i identifies the protection link.

At step 308, the link cost for each protection is link determined by determining the difference between the proposed maximum link vector element and the maximum link vector element. This may be represent as proposed_max(i)−current_max(i), where i identifies the protection link. This difference is the link cost. Referring to the example in FIG. 5, the link cost for protection link e5 is 10 bandwidth units representing the difference the proposed maximum link vector element 20 and maximum link vector element 10. The link costs of links e6, e9 and e10 are 0, 10 and 10 respectively.

Referring to FIG. 3, once the link costs are determined for each protection link at step 214, the path costs are determined for the protection paths at step 216. The path cost is determined by adding the link costs for each protection link forming the protection path. Referring to the example in FIG. 5, the path cost for protection path A-F-E is 10 representing the sum of the link cost for protection link e5 and the link cost for protection link e6. The path cost for new protection path A-H-E is 20.

Flow proceeds to step 218 where the protection path having the lowest path cost is selected to provide protection for the defined working path. This minimizes the addition of new protection bandwidth. In the example shown in FIG. 5, protection path A-F-E has the lower path cost and thus is selected to protect the defined working path. Flow proceeds to step 220 where the link vectors for the protection links in the chosen protection path are updated to reflect the additional bandwidth units for the defined working path. In the example shown in FIG. 5, the link vector for protection link e5 is updated to (20, 20, 10) and the link vector for protection link e6 is updated to (20, 15, 20). The alternate new protection path A-H-E is not established.

The processing performed to determine the appropriate protection path may be implemented by processors on one or more network elements. Thus, the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of allocating protection path resources comprising:

defining a working path;

obtaining a link vector for each of a plurality of protection paths, the link vector including a plurality of link vector elements;

determining a proposed link vector for each of the protection paths, the proposed link vector including a plurality of proposed link vector elements, the proposed link vector indicative of allocating a respective protection path to the working path;

determining a maximum link vector element;

determining a maximum proposed link vector element;

determining a link cost based on a difference between the maximum proposed link vector element and the maximum link vector element;

determining a path cost for at least two protection paths based on a sum of link costs associated with a respective protection path; and selecting one of the at least two protection paths having the minimum path cost to provide protection for the working path.

2. The method of claim 1 wherein the working path represents a new working path.

3. The method of claim 1 wherein the working path represents an increase in bandwidth of an existing working path.

4. The method of claim 1 wherein one of the at least two protection paths is an existing protection path.

5. The method of claim 1 wherein one of the at least two protection paths is a new protection path.

6. The method of claim 1 wherein the at least two protection paths includes all of the plurality of protection paths.

7. The method of claim 1 wherein each link vector element indicates bandwidth allocated to a respective shared risk group.

8. The method of claim 1 further comprising eliminating from consideration a protection link lacking capacity to provide protection for the working path.

9. The method of claim 1 further comprising eliminating from consideration a protection link lacking shared risk group disjointedness with the working path.

10. A network element having a processor and a storage medium having machine-readable computer program code for allocating protection path resources, the storage medium including instructions for causing the processor to implement a method comprising:

defining a working path;

obtaining a link vector for each of a plurality of protection paths, the link vector including a plurality of link vector elements;

determining a proposed link vector for each of the protection paths, the proposed link vector including a plurality of proposed link vector elements, the proposed link vector indicative of allocating a respective protection path to the working path;

determining a maximum link vector element;

determining a maximum proposed link vector element;

determining a link cost based on a difference between the maximum proposed link vector element and the maximum link vector element;

determining a path cost for at least two protection paths based on a sum of link costs associated with a respective protection path; and selecting one of the at least two protection paths having the minimum path cost to provide protection for the working path.

11. The network element of claim 10 wherein the working path represents a new working path.

12. The network element of claim 10 wherein the working path represents an increase in bandwidth of an existing working path.

13. The network element of claim 10 wherein one of the at least two protection paths is an existing protection path.

14. The network element of claim 10 wherein one of the at least two protection paths is a new protection path.

15. The network element of claim 10 wherein the at least two protection paths includes all of the plurality of protection paths.

16. The network element of claim 10 wherein each link vector element indicates bandwidth allocated to a respective shared risk group.

17. The network element of claim 10 further comprising instructions for causing the processor to implement eliminating from consideration a protection link lacking capacity to provide protection for the working path.

18. The network element of claim 10 further comprising instructions for causing the processor to implement eliminating from consideration a protection link lacking shared risk group disjointedness with the working path.

* * * * *